(12) United States Patent
Bolbenes et al.

(10) Patent No.: US 10,481,914 B2
(45) Date of Patent: Nov. 19, 2019

(54) PREDICTING DETECTED BRANCHES AS TAKEN WHEN CUMULATIVE WEIGHT VALUES IN A WEIGHT TABLE SELECTED BY HISTORY REGISTER BITS EXCEED A THRESHOLD VALUE

(71) Applicant: Arm Limited, Cambridge (GB)

(72) Inventors: Guillaume Bolbenes, Antibes (FR); Houdhaifa Bouzguarrou, Valbonne (FR); Luc Orion, Mouans Sartoux (FR); Eddy Lapeyre, Antibes (FR)

(73) Assignee: ARM Limited, Cambridge (GB)

( * ) Notice: Subject to any disclaimer, the term of this patent is extended or adjusted under 35 U.S.C. 154(b) by 30 days.

(21) Appl. No.: 15/806,605

(22) Filed: Nov. 8, 2017

(65) Prior Publication Data

US 2019/0138315 A1 May 9, 2019

(51) Int. Cl.
*G06F 9/38* (2018.01)
*G06F 9/30* (2018.01)

(52) U.S. Cl.
CPC ........ *G06F 9/3844* (2013.01); *G06F 9/30058* (2013.01)

(58) Field of Classification Search
CPC .................................................... G06F 9/3844
See application file for complete search history.

(56) References Cited

U.S. PATENT DOCUMENTS

| | | | |
|---|---|---|---|
| 9,442,726 B1 * | 9/2016 | Bonanno | G06F 9/3806 |
| 9,471,314 B1 * | 10/2016 | Bonanno | G06F 9/3848 |
| 2002/0194465 A1 * | 12/2002 | Sinharoy | G06F 9/3844 |
| | | | 712/239 |
| 2005/0283593 A1 * | 12/2005 | Vasekin | G06F 9/3848 |
| | | | 712/240 |
| 2010/0332812 A1 * | 12/2010 | Burger | G06F 9/3844 |
| | | | 712/239 |
| 2011/0087866 A1 * | 4/2011 | Shah | G06F 9/383 |
| | | | 712/239 |

(Continued)

OTHER PUBLICATIONS

Zihao Zhou, Mayank Kejriwal, and Risto Miikkulainen. "Extended Scaled Neural Predictor for Improved Branch Prediction" IEEE (Year: 2013).*

*Primary Examiner* — Jacob Petranek
(74) *Attorney, Agent, or Firm* — Nixon & Vanderhye P.C.

(57) ABSTRACT

Program flow prediction circuitry comprises a history register to store history data for at least one or more most recently executed branch instructions; a memory to store a plurality of sets of weight values, one set for each of a group of portions of one or more bits of the history data; access circuitry to access, for a current branch instruction to be predicted, a weight value for each of the portions of one or more bits of the history data by selecting from the set of weight values in dependence upon a current value of the portions of the history data; a combiner to generate a combined weight value by combining the weight values accessed by the access circuitry; a comparator to compare the combined weight value with a prediction threshold value to detect whether or not a branch represented by the current branch instruction is predicted to be taken; and weight modifier circuitry to modify the accessed weight values in dependence upon a resolution of whether the branch represented by the current branch instruction is taken or not.

17 Claims, 7 Drawing Sheets

(56) References Cited

U.S. PATENT DOCUMENTS

2012/0166775 A1\* 6/2012 Krishnamurthy ..... G06F 9/3848
  712/239
2017/0153894 A1\* 6/2017 Hornung ............... G06F 9/3806
2018/0285108 A1\* 10/2018 Sadasivam .......... G06F 9/30058

\* cited by examiner

PREDICTING DETECTED BRANCHES AS TAKEN WHEN CUMULATIVE WEIGHT VALUES IN A WEIGHT TABLE SELECTED BY HISTORY REGISTER BITS EXCEED A THRESHOLD VALUE

BACKGROUND

This disclosure relates to program flow prediction.

DESCRIPTION OF THE PRIOR ART

Program flow prediction is used to anticipate events such as branches which change the flow of execution of program instructions. By predicting a branch in program flow, the relevant instructions at the branch target can be fetched for execution so that they are in place (for example, in an execution pipeline) at the appropriate stage. Otherwise, when a branch occurs, the currently fetched instructions have to be discarded and the pipeline refilled with instructions relevant to the branch target.

So, there is a latency penalty for not predicting a branch. There is also a latency penalty for mispredicting a branch, as once again the pipeline would need to be flushed. So, if branch prediction is used, it is a general aim to make it as accurate as possible.

It has been proposed to use a learning arrangement or neural network such as a so-called Perceptron network to provide branch prediction. In a Perceptron arrangement, a neural predictor combines respective bits of an input (branch history register for example) with respective ones of a set of weights, optionally with a bias weight. The prediction is based on the weighted sum of the input bits. The weights can be updated depending on whether or not the prediction agrees with the actual outcome. However, Perceptron arrangements can have a significant power consumption and can also scale in processing requirements or circuit size significantly with the amount of history data used.

SUMMARY

In an example arrangement there is provided program flow prediction circuitry comprising:
a history register to store history data for at least one or more most recently executed branch instructions;
a memory to store a plurality of sets of weight values, one set for each of a group of portions of one or more bits of the history data;
access circuitry to access, for a current branch instruction to be predicted, a weight value for each of the portions of one or more bits of the history data by selecting from the set of weight values in dependence upon a current value of the portions of the history data;
a combiner to generate a combined weight value by combining the weight values accessed by the access circuitry;
a comparator to compare the combined weight value with a prediction threshold value to detect whether or not a branch represented by the current branch instruction is predicted to be taken; and
weight modifier circuitry to modify the accessed weight values in dependence upon a resolution of whether the branch represented by the current branch instruction is taken or not.

In another example arrangement there is provided data processing circuitry comprising:
program flow prediction circuitry as defined above, to predict one or more next instructions to be fetched for execution;
fetch circuitry to fetch the one or more next instructions predicted by the program flow prediction circuitry; and
a processing element to execute instructions fetched by the fetch circuitry.

In another example arrangement there is provided a method comprising:
storing history data for at least one or more most recently executed branch instructions;
storing a plurality of sets of weight values, one set for each of a group of portions of one or more bits of the history data;
accessing, for a current branch instruction to be predicted, a weight value for each of the portions of one or more bits of the history data by selecting from the set of weight values in dependence upon a current value of the portions of the history data;
generating a combined weight value by combining the weight values accessed by the access circuitry;
comparing the combined weight value with a prediction threshold value to detect whether or not a branch represented by the current branch instruction is predicted to be taken; and
modifying the accessed weight values in dependence upon a resolution of whether the branch represented by the current branch instruction is taken or not.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
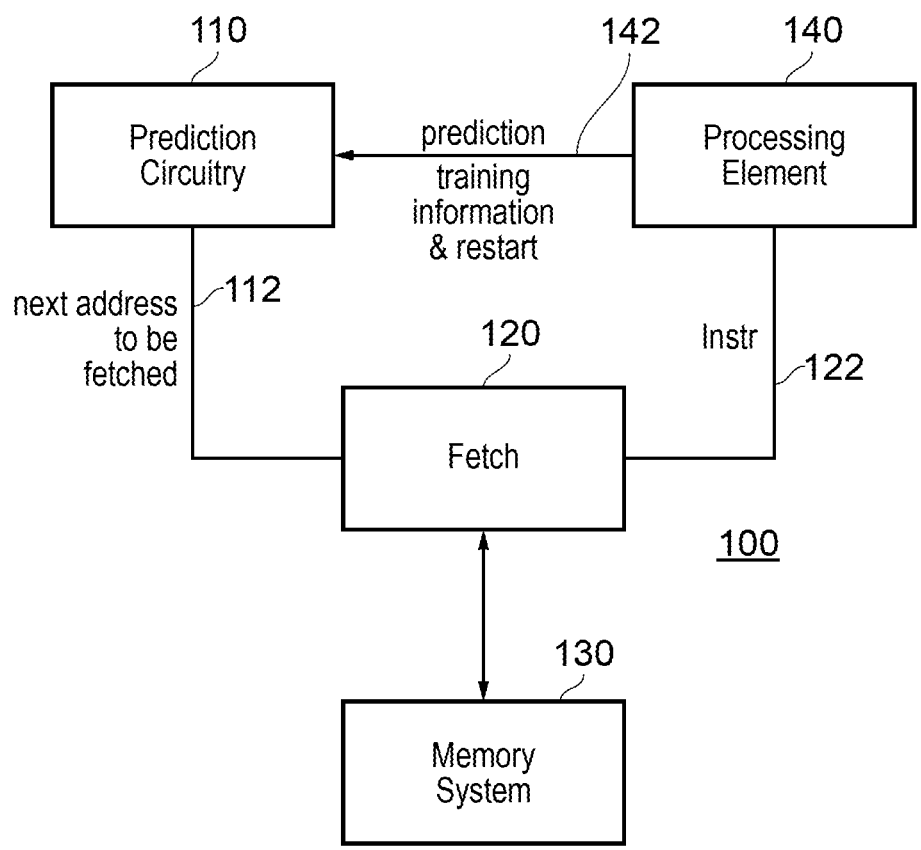
FIG. 1 schematically illustrates data processing circuitry.

Before discussing the embodiments with reference to the accompanying figures, the following description of embodiments is provided.

An example embodiment provides program flow prediction circuitry comprising:
a history register to store history data for at least one or more most recently executed branch instructions;
a memory to store a plurality of sets of weight values, one set for each of a group of portions of one or more bits of the history data;
access circuitry to access, for a current branch instruction to be predicted, a weight value for each of the portions of one or more bits of the history data by selecting from the set of weight values in dependence upon a current value of the portions of the history data;

a combiner to generate a combined weight value by combining the weight values accessed by the access circuitry;

a comparator to compare the combined weight value with a prediction threshold value to detect whether or not a branch represented by the current branch instruction is predicted to be taken; and weight modifier circuitry to modify the accessed weight values in dependence upon a resolution of whether the branch represented by the current branch instruction is taken or not.

In contrast to a Perceptron arrangement, accessing weight values is in dependence upon a portion such as a multi-bit portion of history data. This can dramatically reduce the amount of weight data and/or the processing requirements of program flow prediction circuitry compared to an example Perceptron arrangement, but it has been found empirically that the accuracy of prediction can be maintained in at least example arrangements. The portions could in principle be one bit, accessing a two-entry set of weight values, but in example arrangements each portion represents two or more bits. In example arrangements the portions are complementary, but they could in principle be overlapping.

In some examples, the combiner comprises an adder.

As well as selecting weight values in dependence upon a current value of the multi-bit portions of the history data, in example arrangements the access circuitry is configured to select from the set of weight values according to data dependent upon a program counter value of the current branch instruction.

Some further advantages can include:

(i) Accuracy: Effectively, instead of each individual weight, a table of sub-weights is used. The table of sub-weights is indexed by a sequence of (multiple) history bits. So instead of one weight access in the Perceptron, the embodiments correlate on several history bits allowing a reduction in the number of weight read for a constant history length. Each sub-weight table can be indexed by respective history bits to allow the learning system to detect strong dependency between branches.

(ii) Aliasing resistance: A potential property of these arrangements is their reliability and resistance to aliasing. For each index, a matrix of weights is available. So for one index, sub-weight table_size*number of weight combinations are possible (for example, for 32 weights and the number of history bits being three (so that eight sub-weights are selectable) a basic Perceptron arrangement gives 1 combination of weights while the present arrangements can provide up to $7 \times 10^{28}$ possible combinations of weights).

(iii) Timing/Power: Rather than summing a lot of weights to generate a prediction, examples of the present arrangements can reduce the number of weights (and improve power consumption) and by doing so improve timing (because there may be fewer operands in the sum).

In example arrangements, the history register is configured to store history data for one or more most recent branch instructions when the branch was taken or has been predicted to be taken but has not yet been resolved, and not to store history data for branch instructions when the branch was untaken (although in other examples, such data could be retained, but for example with a flag or other indicator to allow it to be disregarded in the calculations discussed here). This avoids the need (in the Perceptron system) of multiplying each weight by a scaling factor such as +1 or −1 in dependence upon the resolution of whether the branch was taken, and so can reduce the processing requirements of the circuitry.

In example arrangements, the history data representing a particular branch itself comprises a multi-bit history value. Although the history data can be partitioned in various different manners, in example arrangements each portion of the history data represents a corresponding one of the multi-bit history values. For example, the multi-bit history value may be dependent upon a program counter value and a branch target of the branch instruction representing the taken branch, such as a logical combination of at least a part of the program counter value and at least a part of the branch target of the branch instruction.

To provide a learning function, in example arrangements the weight modifier circuitry is configured to increment or decrement the accessed weight values in dependence upon a resolution of whether the branch represented by the current branch instruction is taken or not.

In order to allow the correct weights to be modified later, but without the need to cache the history data by which those weights were selected, in example embodiments the weight modifier circuitry is configured to store a pointer indicating the group of portions (such as complementary portions) of the history data used to access weight values for the current branch instruction. Similarly, in example embodiments the history register is configured to store previous instances of history data not representing a current group of (complementary) portions of one or more bits of the history data between accessing weights by the access circuitry and modifying weights by the weight modifying circuitry.

To avoid the weights increasing in magnitude such that a change in the "other" direction has no practical effect, in example arrangements the weight modifier circuitry is configured to increment the accessed weight values so as not to exceed a first positive threshold value and to decrement the accessed weight values so as not to be more negative than a second negative threshold value. For example, the magnitude of the first positive threshold value may be the same as the magnitude of the second negative threshold value.

In example arrangements, the decision threshold value is zero.

So as to low modification of the weights but still provide access when required to valid weight values, the weight modifier circuitry may be configured to modify the accessed weights by a read-modify-write process.

In example arrangements the circuitry comprises a cache memory storing program counter values and branch target addresses for previously taken branch instructions; and a detector to detect, for a current program counter value, one or more candidate branch target addresses.

The techniques described above are particularly useful in the context of data processing circuitry comprising: program flow prediction circuitry as defined above, to predict one or more next instructions to be fetched for execution; fetch circuitry to fetch the one or more next instructions predicted by the program flow prediction circuitry; and a processing element to execute instructions fetched by the fetch circuitry. For example, for a branch instruction amongst the one or more next instructions to be fetched by the fetch circuitry: the program flow prediction circuitry can be configured to predict whether the branch will be taken and, when a branch is predicted to be taken, to predict one or more subsequent instructions to be fetched for execution in dependence upon a predicted target of the branch instruction; and the processing element can be configured to indicate to the program flow prediction circuitry whether a branch is taken and, if so, the branch target address.

In some examples, multiple predictions can be provided for a multi-way branch target buffer. For example, the cache memory may be a multi-way cache memory having a plurality n of ways; the detector may be configured to detect whether a candidate branch target address is held by each of the ways of the cache memory so as to detect up to n candidate branch target addresses; the circuitry may be configured to provide a prediction in respect of each of the n ways; and the circuitry may comprise a selector to select a branch target address for a way having a prediction that a branch is taken, and for which the corresponding program counter value stored for that branch target address is nearest to a current program counter value.

Another example embodiment provides a method comprising:

storing history data for one or more most recently executed branch instructions;

storing a plurality of sets of weight values, one set for each of a group of complementary portions of one or more bits of the history data;

accessing, for a current branch instruction to be predicted, a weight value for each of the complementary portions of one or more bits of the history data by selecting from the set of weight values in dependence upon a current value of the portions of the history data;

generating a combined weight value by combining the weight values accessed by the access circuitry;

comparing the combined weight value with a prediction threshold value to detect whether or not a branch represented by the current branch instruction is predicted to be taken; and modifying the accessed weight values in dependence upon a resolution of whether the branch represented by the current branch instruction is taken or not.

Referring now to the drawings, FIG. 1 schematically illustrates data processing circuitry 100 comprising: program flow prediction circuitry 110, fetch circuitry 120 to fetch one or more next instructions predicted by the program flow prediction circuitry 110 from a memory system 130 including, for example, a main memory and/or one or more levels of cache memory, and a processing element 140 to execute instructions fetched by the fetch circuitry 120.

In operation, the prediction circuitry 110 provides information 112 to the fetch circuitry 120 defining at least a next instruction address to be fetched. The fetch circuitry 120 fetches the relevant instruction from the memory system 130 and provides the fetched instruction 122 to the processing element 140. The processing element 140 executes each fetched instruction and, where appropriate as discussed below, provides information 142 back to the prediction circuitry 110. The information 142 may include information defining the success of the predictions such as information defining whether a branch instruction in the set of instructions 122 fetched by the fetch circuitry 120 led to a branch being taken or not taken, and, if necessary because the prediction has been incorrect, an instruction to the prediction circuitry 110 to restart its operations.

The prediction circuitry 110 generates a prediction, for a branch instruction amongst the one or more next instructions defines by the address or addresses 112 to be fetched by the fetch circuitry 120, as to whether the branch will be taken. When a branch is predicted to be taken, the prediction circuitry is arranged to predict one or more subsequent instructions to be fetched by the fetch circuitry 120 for execution by the processing element 140 in dependence upon a predicted target of the branch instruction. In executing a branch instruction, the processing element 140 provides a so-called "resolution" of the branch, which is to say, a definitive outcome regarding the question of whether the branch is taken or not, since this depends on actual, rather than predicted, circumstances and conditions prevailing at the time that the branch is executed. Whether or not a branch instruction has been predicted by the prediction circuitry 110, and, if predicted, whether or not it was predicted that the branch would be taken, the processing element indicates as part of the data 142 to the prediction circuitry 110:

(a) whether any branch instruction encountered amongst the instructions 122 is taken, and, if so, (b) the branch target address.

Figure 2:
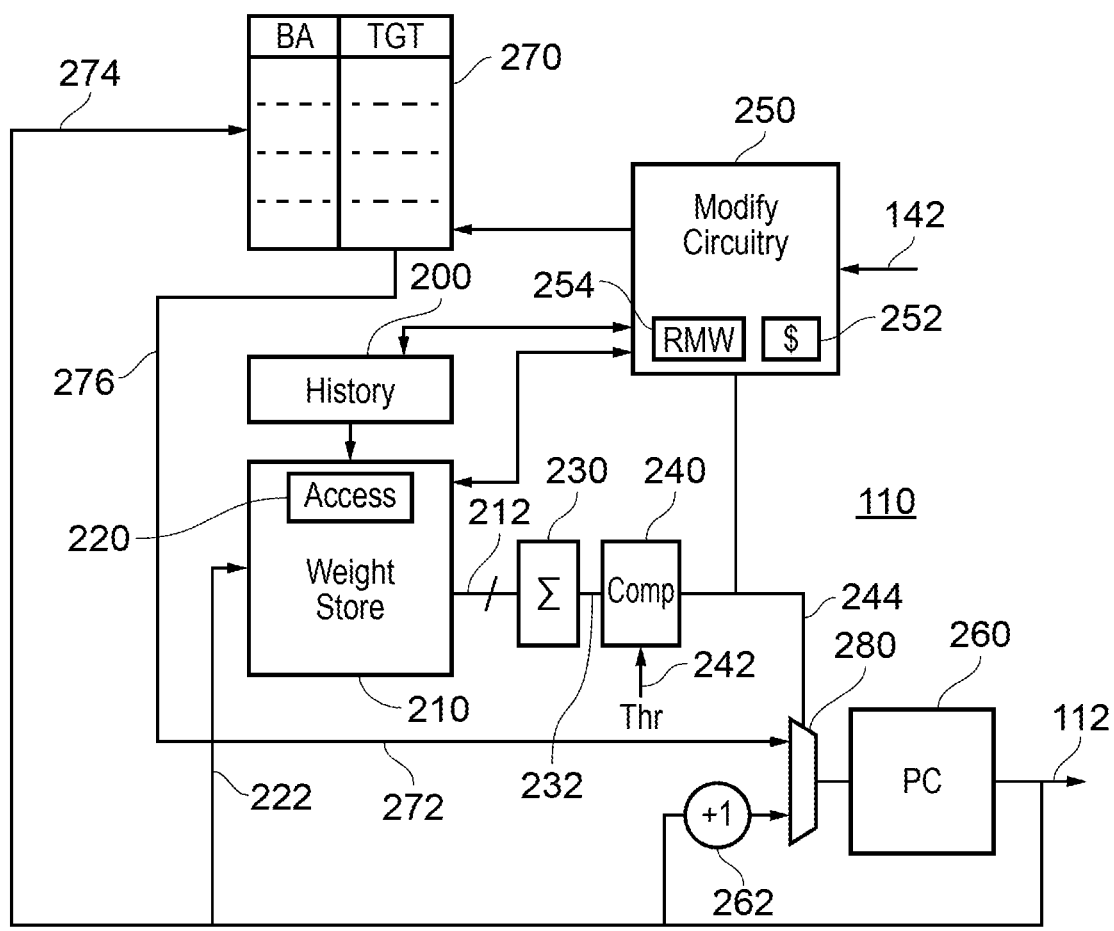
FIG. 2 schematically illustrates program flow prediction circuitry.

FIG. 2 schematically illustrates aspects of the prediction circuitry 110 in more detail. The prediction circuitry 110 comprises a history register 200 to store history data for one or more most recently executed branch instructions. Examples of the format and use of history data will be discussed below.

A memory 210, referred to as a weight store, stores a plurality of sets of weight values, one set for each of a group of complimentary portions of one or more bits of the history data. Again, the format in use of the weight values will be discussed in further detail below.

Access circuitry 220 is arranged to access, for a current branch instruction to be predicted, a weight value for each of the complimentary portions of one or more bits of the history data by selecting from the set of weight values in dependence upon a current value of the portions of the history data. As mentioned above, the portions could be just one bit, but in example arrangements they represent are more than one bit each.

A combiner 230, for example an adder, is arranged to generate a combined weight value 232 by combining the weight values 212 accessed by the access circuitry 230. A comparator 240 compares the combined weight value 232 with a prediction threshold value 242 to detect whether or not a branch represented by the current branch instruction is predicted to be taken or not.

Modify circuitry 250 is arranged to modify the accessed weight values in dependence upon a resolution of whether or not the branch represented by the current branch instruction is taken, as defined by the information 142 received from the processing element 140. The term "resolution" in this context implies the actual outcome derived from the actual execution of that instruction. Note that this modification could take place some period of time after the prediction was first made, because of the time required for the fetch circuitry to fetch the relevant instruction, the processing element to execute the instruction and resolve the branch, and then the time for the processing element to communicate back to the prediction circuitry the outcome of the branch. In the present examples, a respective modification is made in either case, which is to say if the branch was taken or if the branch was not taken. Between the time that the prediction is made and the time that the branch is resolved and the modification made, the prediction can be referred to as an "in flight" prediction.

A program counter register 260 maintains a prevailing value of the next address to be fetched 112 to be supplied to the fetch circuitry 120. The next address to be fetched is either:

(i) a previous address as fetched to which one instruction position (for example, four bytes in a 32 bit instruction system) is added by an adder 262; or (ii) a predicted target address 272 provided by a branch target buffer 270.

A selection is made between these two candidate "next addresses" by a multiplexer 280 under the control of a signal 244 indicative of the current prediction generated by the comparator 240.

The branch target buffer 270 represents an example of a cache memory storing program counter values ("branch address" or "BA") and branch target addresses ("TGT") for previously taken branch instructions. These are stored in the branch target buffer 270 by the modify circuitry 250 on the basis of corresponding information received as part of the information 142 from the processing element 140 for branches which have been taken. For example, the branch target buffer 270 may be a four-way associative cache in which a branch address and a target are store in a selected one of the ways according to (for example) a portion or hash of the branch address and according to an eviction policy to evict older stored entries.

Figure 10:
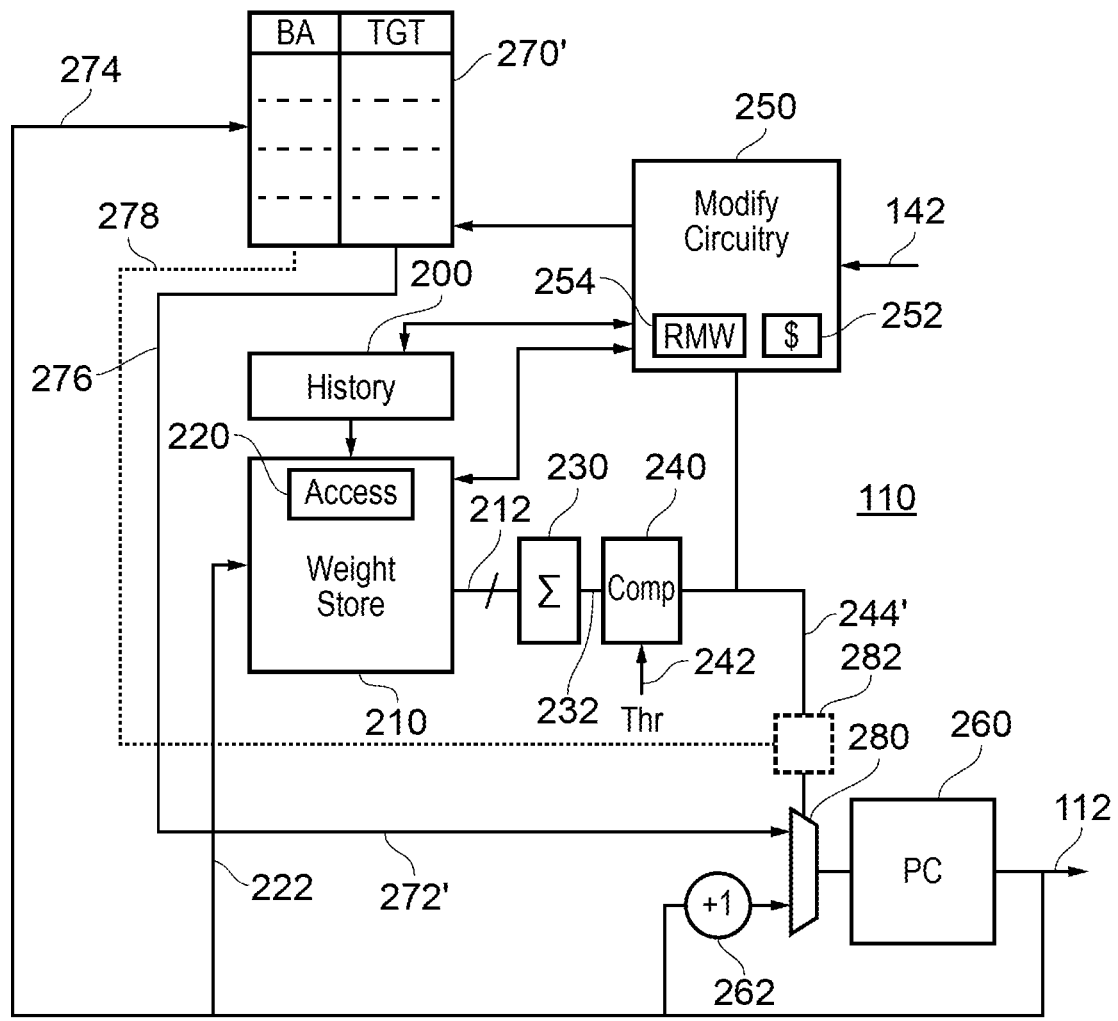
FIG. 10 schematically illustrates another example of program flow prediction circuitry.

In connection with a next address to be fetched, this is used as an index 274 into the branch target buffer resulting in the output of zero or more potential branch targets 276 forming the address 272 provided to the multiplexer 280. In the example of FIG. 2, zero or one matches are detected. In the example of FIG. 10 to be discussed below, potentially up to one match for each buffer way (of an example four way buffer) is detected.

In this regard, the branch target buffer 270 also acts as a detector to detect, for a current value counter value, one or more candidate branch target addresses. As mentioned above, in response to an indication from the processing element 140 forming part of the date 142 that a branch represented by a current branch instruction was taken, the circuitry is configured to update the branch address and target values stored by the branch target buffer 270.

So, for an address under consideration, the branch target buffer 270 provides an indication of a target which may apply in respect of a potential branch instruction at that address, and the remainder of the circuitry such as the history buffer, the weight store, the access circuitry, the combiner and the comparator form the prediction 244 as to whether that branch will be taken. If the branch will be taken, then the target address is provided as a next address to be fetched 112.

Figure 3:
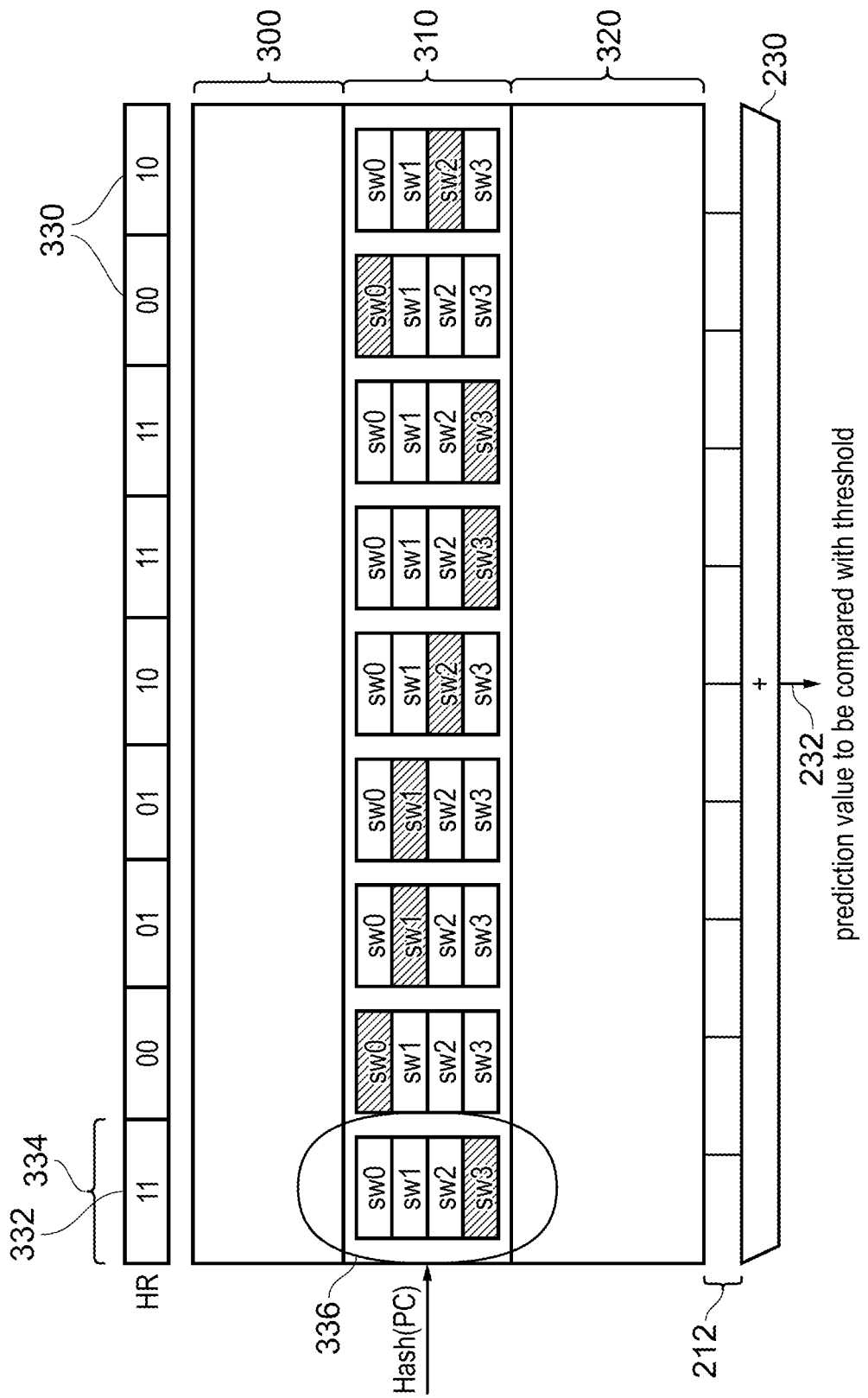
FIG. 3 schematically illustrates a set of weights.

FIG. 3 schematically represents the format of the weight store data and the use of the access circuitry 220 to access weight values.

Viewed schematically, the weight store is arranged to store multiple sets 300, 310, 320 of groups of sub-weight ("sw") data. One of the sets 300, 310, 320 is selected by the access circuitry according to the program counter value 222. For example, a hash of the program counter value could be used, or in other examples, a subset of bits, the number of bits being dependent upon the number of sets 300, 310, 320 . . . . Within one set of sub-weight data such as the set 310, the sub-weights are accessed in dependence upon a group of complimentary portions 330 of the history data. Each of the complimentary portions is formed of more than one bit of the history data. The number of sub-weights selectable by each portion is $2^n$, where n is the number of bits in a portion. In the example shown in FIG. 3, n=2 and there are 4 sub-weights (sw0 . . . sw3) selectable by each of the complimentary portions. The selection of a particular sub-weight by each portion is schematically represented in FIG. 3 by that sub-weight being shaded.

In connection with the manner in which the weight store was described earlier, there are a plurality of sets of weight values, one set for each of a group of complimentary portions of one or more bits of the history data. So for example, the portion 332 has an associated set of weight values represented by a column of values 334 in FIG. 3. Within that overall set of weight values, a selection amongst the sets 300, 310, 320 . . . . (Horizontal divisions as drawn) narrows the choice of sub weights for the portion 332 to the sub-weights 336. Amongst the sub weights 336, one sub weight (sw3 in the example) is selected based on the value (11 binary or 3 decimal in this example) of the portion 332. So, there is indeed a set (drawn as a vertical column in the schematic representation) for each of a group of complimentary portions of one or more bits of the history data, and there is also a set (drawn horizontally in the schematic representation) selectable according to according to data dependent upon a counter value of the current instruction under consideration (drawn as "hash(PC)").

In principle at least, the portions can be of any size such that the number of sub-weights selectable by a portion is still $2^n$. It is the selected sub-weights which are provided as the data 212 to the combiner or adder 230 to be added into the value 232 for comparison with the threshold 242 by the comparator 240.

In the present examples, the sub-weights can have positive or negative values. The addition of the sub-weights leads to a combined value 232 which may be positive or negative. In the present examples, the threshold 232 is a threshold of 0 so that a branch is predicted to be taken if the sum 232 is greater than 0. If not, the branch is not predicted to be taken.

Therefore, in FIG. 3, the access circuitry 220 is not only configured to select from the set of weight values according to the complimentary portions 330 of the history data, but is also configured to select from the set of weight values according to data dependent upon a counter value of the current instruction under consideration (in FIG. 3, the selection of the set 310 of sub-weights).

Figure 4:
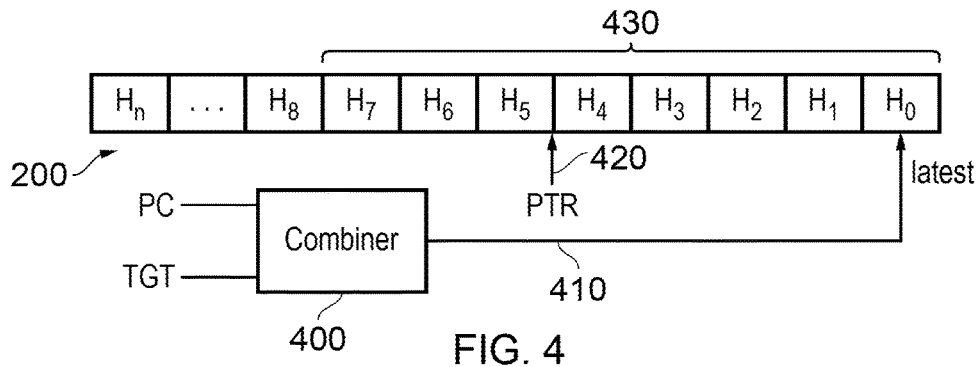
FIG. 4 schematically illustrates a history register.

FIG. 4 schematically illustrates an example of the operation and use of the history register 200.

In these examples, the history register 200 stores history data for one or more most recent branch instructions when the branch was indeed taken, and does not store history data for branch instructions when the branch was untaken. The history data representing a particular branch may comprise a multi-bit history value H0 . . . Hn. The multi-bit history value may be generated, for example, by a combiner 400 which combines (for example, by a logical exclusive-OR operation) a selected set of bits such as bits 7:5 of the branch address or program counter of a taken branch and a selected set of bits (such as bits 7:5) of the branch target address for that taken address. The resulting multi-bit value 410 is stored in the history buffer 200 as a latest or most recent value H0, the previous H0 is moved to a history position H1 (carried out for example, by changing a "latest entry" pointer relative to the history buffer), and the history data is effectively shuffled along in order of how recently the taken branches were executed. The history data 430 used by the access circuitry 220 comprises, in this example, H0 . . . H7. As mentioned, each multi-bit history value is dependent upon a program counter value and a branch target of a respective branch instruction representing a particular branch. Using the combiner 400, the multi-bit history value may be dependent upon a logical combination such as an exclusive-OR combination of at least a part of the program counter value and at least a part of the branch address of the taken branch instruction.

As shown in FIG. 4, the history buffer may in fact store previous instances of history data H8 . . . Hn. These previous instances of history data are used by the modify circuitry 250 as follows. For an "in-flight" branch, which is to say a branch for which a prediction has been made that the branch will be taken but the corresponding instruction has not been completely resolved by the processing element 140, the modify circuitry stores, in a cache 252, data defining the branch address and branch target address for that prediction and also a pointer. The pointer is shown schematically as a pointer 420 in FIG. 4, indicating the set of history data which was originally used to access weight values to make that in-flight prediction.

This allows the modify circuitry 250 to access the same set of weight values later, when the information 142 relating to whether or not the branch was actually taken during execution by the processing element 140 is received. That way, the modify circuitry 250 can modify the same weights used to make that prediction, which provides a learning function for the set of weights in the weight store 210 because they are modified in response to the success or failure of a prediction in which they were used.

So, the history buffer provides not only the history data 430 which is portioned into complimentary portions to access the weight store but also previous history data so that, using a pointer such as the pointer 420, the modify circuitry 250 can re-access that same history data to obtain a set of weights from the weight store 210 to be modified once the resolution of the branch is known.

The number of instances H8 . . . Hn of history data to be retained in this way can be selected as a design consideration so that it is generally enough to allow for processing delays and latency in executing a branch instruction. The aim here is that the relevant history data is still available for use by the modify circuitry 250 when an in-flight prediction is resolved. Storing this information in the form of a pointer 420 at the modify circuitry 250 avoids the need for the modify circuitry 250 itself to store the set of history values to allow it to access the same set of weight values.

Figure 5:
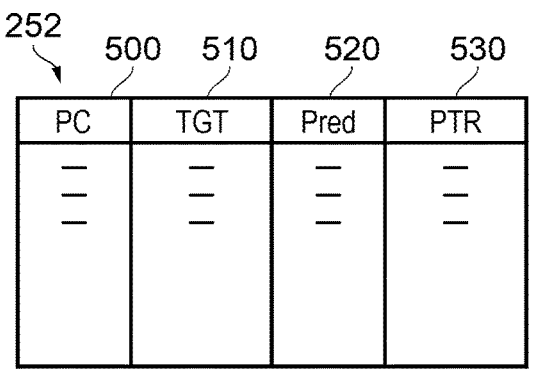
FIG. 5 schematically illustrates the contents of a cache.

The operation of the modify circuitry 250 will be discussed in more detail below. First, FIG. 5 schematically illustrates the contents of the cache 252 of the modify circuitry 250, storing a set of instances of a program counter or branch address 500, a target address 510, a prediction indication 520 (was the branch predicted to be taken or not) and the pointer 420 (530).

The modify circuitry also comprises read-modify-write circuitry 254 to modify the stored sub-weights. Operation of this circuitry will be discussed with reference to FIG. 6.

Figure 6:
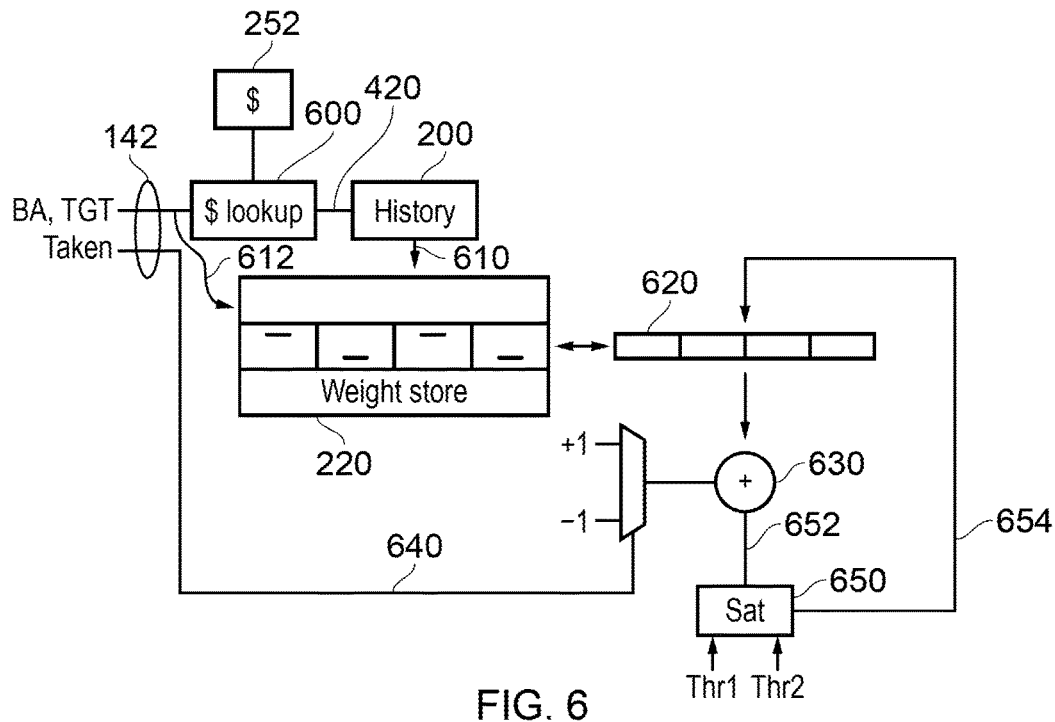
FIG. 6 schematically illustrates circuitry to modify weight values.

In FIG. 6, in response to receipt of the information 142 from the processing element 140 defining at least a branch address, a target address and whether the branch was taken, the modify circuitry 250 looks up (using cache lookup circuitry 600) in the cache 252 to obtain the pointer 420 and from this, accesses the history data store 200 to obtain the history data 610 as used in that particular prediction by which it access the weight store 220. The branch address 612 is also used to access the relevant set (horizontal division in FIG. 3) of sub-weights in the weight store. These sub-weights are read from the weight store by the read-modify-write circuitry 254 of the modify circuitry and stored in a temporary buffer 620 of the read-modify-write circuitry. Using an adder 630, a value of +1 or −1, selectable under control of the signal 640 forming part of the information 142 indicating whether the branch was taken is added to each weight. For example, the value +1 can be selected if the branch was taken, and the value −1 selected if the branch was not taken.

In some examples, the weights can be directly written back to the buffer and returned to the relevant positions in the weight store. In other examples, however, a saturation detector 650 detects whether the resulting modified weight value is greater than an upper threshold Thr1 or less than a lower threshold Thr2 (both of which may correspond to the same magnitude but with different positive or negative polarities), and if so, the output of the adder 652 is clipped to a clipped value 654 no greater than the upper threshold and no lower or more negative than the lower threshold. If the output 652 of the adder 630 is between the lower and upper thresholds, no action is taken by the saturation detector 650. The value 654 are returned to the temporary buffer 620 and then written back to the relevant locations in the weight store 220. The clipping or saturation function can help to avoid the weights becoming excessively large in magnitude, positive or negative. If such large weights were allowed, the effect of an increment or decrement in the opposite sense would be potentially swamped by the magnitude of the weight.

Therefore, in examples, the modify circuitry 250 is configured to increment or decrement the accessed weight values in dependence upon whether the branch represented by the respected branch instruction was taken or not. Note that the increment or decrement could be by an amount other than one, and the increment and decrement do not have to be by the same amount. For example, if the branch was taken, the weights could be increased by (for example) +2 and if the branch was not taken the weights could be decreased by (for example) −3.

As mentioned, the weight modifier circuitry is configured to store in the cache 252 the pointer 420 indicating the group of complimentary portions of the history data which were used to access weight values for the branch instruction. To assist with this, the history register 200 may be configured to store previous instances of history data not representing a current group 430 of complimentary portions of history data. This information can be stored at least while a prediction is "in flight", which is to say between the accessing of weights by the access circuitry and the modifying of weights by the weight modifying circuitry.

Using the saturation detector 650, the weight modifying circuitry may be configured to increment the accessed weights so as not to exceed a first positive threshold value and to decrement the accessed weight values so as not to be more negative than a second negative threshold value. As mentioned, in some examples, the magnitude of the first positive threshold value is the same as the magnitude of the second negative threshold value. Using the techniques shown in FIG. 6, the weight modifier circuitry may be configured to access and change the weights by a read-modify-write process. Using the read-modify-write process, the system ensures that there is always a value of each sub weight available for use.

In the examples discussed above, each portion of the history data represented a corresponding one of the multi-bit history values. That is to say the portions used for the selection of sub-weights were the same as the multi-bit values generated for a single instance for a previously taken branch.

Note that the history data could be updated only when the branch is finally resolved. In an alternative the history data could be speculatively updated in response to predicted branches, which would then mean that if the branch is resolved the other way (not taken) the speculatively added history data could be deleted by the circuitry of FIG. 6. Therefore, the history register can be configured to store history data for one or more most recent branch instructions when the branch was taken or has been predicted to be taken but has not yet been resolved.

Two alternatives will be discussed now with reference to FIG. 7 and FIG. 8.

Figure 7:
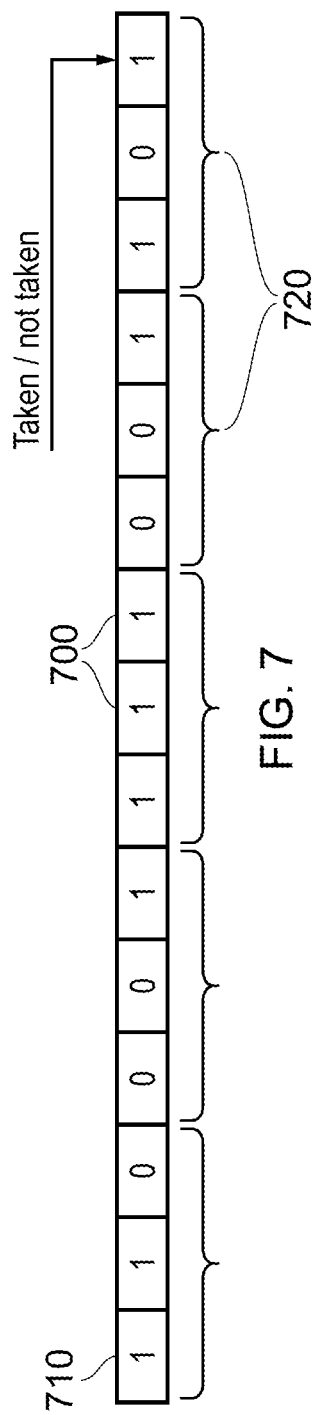
FIG. 7 schematically illustrates a global history register.

Referring to FIG. 7, a so-called global history register is provided. This is different to the history buffer discussed above, in that each bit 700 is set to a first value such as 1 if a most-recently branch instruction resulted in the branch being taken, and to a second value such as 0 if such a branch was not taken. These are stored in order of how recent the respective branch instruction was executed. Such a global history register 710 can be divided into portions of one or more bits such as the example three-bit portions 720 shown in FIG. 7 for operation of the present techniques as discussed above.

Figure 8:
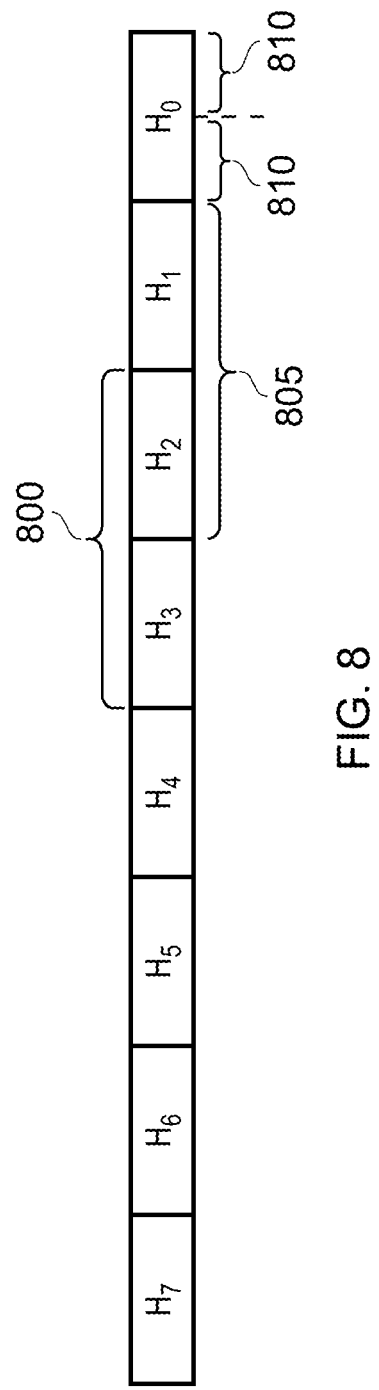
FIG. 8 schematically illustrates the generation of data portions.

Referring to FIG. 8, a set of history data similar to that in FIG. 4 is used, but two other examples of the division into complimentary portions are shown, such as a portion 800 comprising a concatenation of two instances (such as H2 and H3) of the history data, or in an alternative arrangement, portions 810 each representing a part of a single instance of the history data such as H0. Here, H0 is considered to have an even number of bits to allow the even division into two sections. In further alternatives, the history data store could be partitioned so that the boundaries between partitions do not necessarily align between instances of history data.

Note that in example arrangements the portions are complementary, which implies that any individual bit of history data appears in no more than one portion (in examples, each appears in exactly one portion). But it is feasible for the portions to be non-complementary such as overlapping, and a portion 805 overlapping the portion 800 is indicated as a schematic example in FIG. 8.

Figure 9:
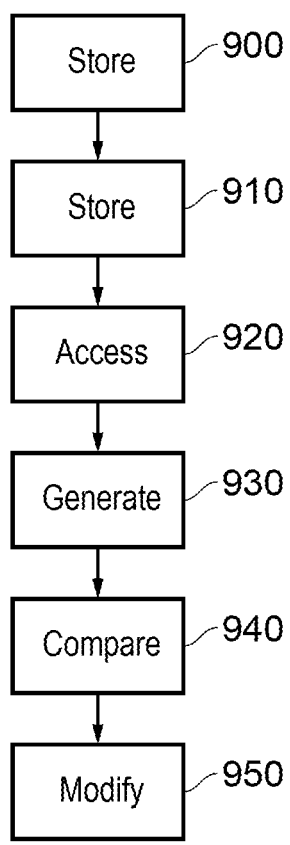
FIG. 9 is a schematic flow diagram illustrating a method.

FIG. 9 is a schematic flow chart illustrating a method comprising:

storing (at a step 900) history data for at least one or more most recently executed branch instructions;

storing (at a step 910) a plurality of sets of weight values, one set for each of a group of complimentary portions of one or more bits of the history data;

accessing (at a step 920) for a current branch instruction to be predicted, a weight value for each of the complimentary portions of one or more bits of the history data by selecting from the set of weight values in dependence upon a current value of the portions of the history data;

generating (at a step 930) a combined weight value by combining the weight values accessed by the access circuitry;

comparing (at a step 940) the combined weight value with a prediction threshold value to detect whether or not a branch represented by the current branch instruction is predicted to be taken; and modifying (at a step 950) in accessed weight values in dependence upon whether the branch represented by the current branch instruction is taken or not.

FIG. 10 provides another schematic example of circuitry similar to that shown in FIG. 2. Items shown in FIG. 10 which operate in the same manner as in FIG. 2 will not be described again.

FIG. 2 concerned an arrangement in which the branch target buffer 270 provided either zero "hits" or one hit, where a hit represents an entry matching the current PC. It is however possible for one hit to be provided for each way of the branch target buffer 270'.

As mentioned above, the branch target buffer 270' is a multi-way (such as four way) buffer which can be indexed by a hash or subset of the PC. Purely as an example, consider the case in which the branch target buffer 270' is indexed by PC[12:5], this notation indicating bits of the 48 Bit (in this example) PC between bits 5 and 12, counting from the least significant bit 0. PC[12:5] can be the index, or a value hashed from PC[12:5] could be the index. Other ranges of bits or widths could be used instead. This value (the subset of bits or the hash of the subset of bits) provides an index to a storage location in each of the ways.

A hit is then detected based on a comparison of the stored BA[48:5] with PC[48:5]. This can lead to multiple hits being detected, representing potentially several branches all having a BA which is equal to the PC within the granularity of PC[4:0].

The zero or more BA values are output as branch addresses 278. The information 272' represents a "per way" (one for each way) target address TGT.

The processing of weight values is carried out as discussed above, based on the history data and weight lookup applicable to the current PC value. However, this is performed once for each way of the buffer 270'. So, there are (in the example of a four way buffer) an instance of the history buffer (the data from which is used for each per-way process) (or in an alternative four instances of the history buffer) and four instances of the weight store and associated circuitry including the units 230, 240. Only one instance is shown in FIG. 10 for clarity of the diagram, but the four instances of the prediction arrangement provide four separate predictions 244', on prediction for each buffer way.

A selector 282 receives the BA values 278 and the predictions 244' and (using the multiplexer 280) selects one of the "per way" TGTs 272' or the next address PC+1, depending on the prediction outcome. The selection is according to the earliest one of the branch addresses 278 in program order relative to the current PC, so that the TGT value for the one of the BA values which is associated with a prediction of "branch taken" and which is earliest in program order will be selected.

If no targets are provided by the branch target buffer 270', then the multiplexer 280 is controlled by the selector 282 to select PC+1.

As an example:

The BA of a hit on way 2 has BA[4:0]==5'b0000 (in other words, a hit was generated for PC[4:0]==5'b0000). The BA of a hit on way 0 has BA[4:0]==5'b0010 (in other words, a hit was generated for PC[4:0]==5'b0010)

In this case in program order, the BA for way 2 is before way 0.

If way 2 is predicted as "taken" by the predictor then as it is the first one in program order then the next PC output by the multiplexer 280 will be the TGT value for way 2.

If way 2 is predicted as "not taken" and way 0 is predicted as "taken" by the predictor then the next PC output by the multiplexer 280 will be the TGT value for way 0.

If way 2 and way 0 are predicted as "not taken" then the next PC output by the multiplexer 280 will be PC+1.

The updating of the history data and the weight values is carried out either on the global values (if one history buffer is used) or for the appropriate way selected by this process. The cache 252 can also store an indication of the way used in the current prediction, to allow the correct values to be updated as discussed above.

Therefore, as mentioned, in some examples, the cache memory is a multi-way cache memory having a plurality n of ways and the detector is configured to detect whether a candidate branch target address is held by each of the ways of the cache memory so as to detect up to n candidate branch target addresses.

This therefore provides an example in which the circuitry is configured to provide a prediction 244' (by the single or multiple instances of the history buffer, the weight store and the like) in respect of each of the n ways; and the circuitry comprises a selector 282 to select a branch target address for a way having a prediction that a branch is taken, and for which the corresponding program counter value stored for that branch target address is nearest to a current program counter value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Program flow prediction circuitry comprising:
   a history register to store history data for at least one or more most recently executed branch instructions, in which the history data for a branch represented by a particular branch instruction comprises a multi-bit history value dependent upon a program counter value and a branch target of the branch represented by the particular branch instruction;
   a memory to store a plurality of sets of weight values, one set for each of a group of complementary portions of one or more bits of the history data;
   access circuitry to access, for a current branch instruction to be predicted, a weight value for each of the portions of one or more bits of the history data by selecting from the set of weight values in dependence upon a current value of the portions of the history data;
   a combiner to generate a combined weight value by combining the weight values accessed by the access circuitry;
   a comparator to compare the combined weight value with a prediction threshold value to detect whether or not a branch represented by the current branch instruction is predicted to be taken; and
   weight modifier circuitry to modify the accessed weight values in dependence upon a resolution of whether the branch represented by the current branch instruction is taken or not.

2. Circuitry according to claim 1, in which the combiner comprises an adder.

3. Circuitry according to claim 1, in which the access circuitry is configured to select from the set of weight values according to data dependent upon a program counter value of the current branch instruction.

4. Circuitry according to claim 1, in which the history register is configured to store history data for one or more most recent branch instructions when the branch was taken or has been predicted to be taken but has not yet been resolved, and not to store history data for branch instructions when the branch was untaken.

5. Circuitry according to claim 1, in which each portion of the history data represents a corresponding one of the multi-bit history values.

6. Circuitry according to claim 1, in which the multi-bit history value is dependent upon a logical combination of at least a part of the program counter value and at least a part of the branch target of the branch instruction.

7. Circuitry according to claim 1, comprising:
   a cache memory storing program counter values and branch target addresses for previously taken branch instructions; and
   a detector to detect, for a current program counter value, zero or more candidate branch target addresses.

8. Circuitry according to claim 7, in which:
   the cache memory is a multi-way cache memory having a plurality n of ways;
   the detector is configured to detect whether a candidate branch target address is held by each of the ways of the cache memory so as to detect up to n candidate branch target addresses;
   the circuitry is configured to provide a prediction in respect of each of then ways; and
   the circuitry comprises a selector to select a branch target address for a way having a prediction that a branch is taken, and for which the corresponding program counter value stored for that branch target address is nearest to a current program counter value.

9. Data processing circuitry comprising:
   program flow prediction circuitry according to claim 1, to predict one or more next instructions to be fetched for execution;
   fetch circuitry to fetch the one or more next instructions predicted by the program flow prediction circuitry; and
   a processing element to execute instructions fetched by the fetch circuitry.

10. Data processing circuitry according to claim 9, in which:
    for a branch instruction amongst the one or more next instructions to be fetched by the fetch circuitry:
    the program flow prediction circuitry is configured to predict whether the branch will be taken and, when a branch is predicted to be taken, to predict one or more subsequent instructions to be fetched for execution in dependence upon a predicted target of the branch instruction; and
    the processing element is configured to indicate to the program flow prediction circuitry whether a branch is taken and, if so, the branch target address.

11. A method comprising:
    storing history data for at least one or more most recently executed branch instructions, in which the history data for a branch represented by a particular branch instruction comprises a multi-bit history value dependent upon a program counter value and a branch target of the branch represented by the particular branch instruction;

storing a plurality of sets of weight values, one set for each of a group of complementary portions of one or more bits of the history data;

accessing, for a current branch instruction to be predicted, a weight value for each of the portions of one or more bits of the history data by selecting from the set of weight values in dependence upon a current value of the portions of the history data;

generating a combined weight value by combining the weight values accessed by the access circuitry;

comparing the combined weight value with a prediction threshold value to detect whether or not a branch represented by the current branch instruction is predicted to be taken; and modifying the accessed weight values in dependence upon a resolution of whether the branch represented by the current branch instruction is taken or not.

12. Program flow prediction circuitry comprising:

a history register to store history data for at least one or more most recently executed branch instructions;

a memory to store a plurality of sets of weight values, one set for each of a group of portions of one or more bits of the history data;

access circuitry to access, for a current branch instruction to be predicted, a weight value for each of the portions of one or more bits of the history data by selecting from the set of weight values in dependence upon a current value of the portions of the history data;

a combiner to generate a combined weight value by combining the weight values accessed by the access circuitry, in which the combiner comprises an adder;

a comparator to compare the combined weight value with a prediction threshold value to detect whether or not a branch represented by the current branch instruction is predicted to be taken; and weight modifier circuitry to modify the accessed weight values in dependence upon a resolution of whether the branch represented by the current branch instruction is taken or not, in which the weight modifier circuitry is configured to increment or decrement the accessed weight values in dependence upon the resolution of whether the branch represented by the current branch instruction is taken or not and to store a pointer indicating the group of portions of the history data used to access weight values for the current branch instruction.

13. Circuitry according to claim 12, in which the history register is configured to store previous instances of history data not representing a current group of portions of one or more bits of the history data between accessing weights by the access circuitry and modifying weights by the weight modifying circuitry.

14. Circuitry according to claim 12, in which the weight modifier circuitry is configured to increment the accessed weight values so as not to exceed a first positive threshold value and to decrement the accessed weight values so as not to be more negative than a second negative threshold value.

15. Circuitry according to claim 14, in which the magnitude of the first positive threshold value is the same as the magnitude of the second negative threshold value.

16. Circuitry according to claim 15, in which the decision threshold value is zero.

17. Circuitry according to claim 12, in which the weight modifier circuitry is configured to modify the accessed weights by a read-modify-write process.

* * * * *